United States Patent
Matsuno et al.

(10) Patent No.: US 10,177,796 B2
(45) Date of Patent: Jan. 8, 2019

(54) RECEIVER AND RADIO COMMUNICATION DEVICE

(71) Applicant: KABUSHIKI KAISHA TOSHIBA, Minato-ku (JP)

(72) Inventors: Junya Matsuno, Kawasaki (JP);
Hidenori Okuni, Yokohama (JP);
Masanori Furuta, Odawara (JP);
Tetsuro Itakura, Nerima (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 3 days.

(21) Appl. No.: 15/443,541

(22) Filed: Feb. 27, 2017

(65) Prior Publication Data

US 2018/0069577 A1    Mar. 8, 2018

(30) Foreign Application Priority Data

Sep. 6, 2016  (JP) .................................. 2016-173996

(51) Int. Cl.
| | |
|---|---|
| H04B 1/10 | (2006.01) |
| H04B 1/04 | (2006.01) |
| H04L 7/00 | (2006.01) |
| H04L 27/00 | (2006.01) |

(52) U.S. Cl.
CPC ............. *H04B 1/1027* (2013.01); *H04B 1/04* (2013.01); *H04L 7/0016* (2013.01); *H04L 27/00* (2013.01)

(58) Field of Classification Search
CPC ........ H04B 1/1027; H04B 1/04; H04L 7/0016
See application file for complete search history.

(56) References Cited

U.S. PATENT DOCUMENTS 8,737,550 B1 * 5/2014 Jonsson .............. H04L 25/0202
375/350
2009/0323766 A1 * 12/2009 Wang .................. H04B 1/7075
375/130

FOREIGN PATENT DOCUMENTS

JP        2016-39503        3/2016

* cited by examiner

*Primary Examiner* — Nay A Maung
*Assistant Examiner* — Angelica M Perez
(74) *Attorney, Agent, or Firm* — Oblon, McClelland, Maier & Neustadt, L.L.P.

(57) ABSTRACT

A receiver has a receiving unit to receive a radio signal, a signal detector to detect a reception signal in each of a plurality of set periods shifted in time to be overlapped in a partial period, and a demodulating unit to perform demodulation processing based on the reception signal. The signal detector has a smoothing unit to smooth the output signal of the receiving unit in each of the plurality of set periods, a comparing unit to output a signal obtained by comparing a level of the smoothed signal, with a threshold value, and an initializing unit to initialize the signal smoothed by the smoothing processing unit, every time the comparing unit compares the smoothed signal with the threshold value, and the demodulating unit performs the demodulation processing based on the smoothed signal determined to be the threshold value or more by the comparing unit.

18 Claims, 13 Drawing Sheets

RECEIVER AND RADIO COMMUNICATION DEVICE

CROSS REFERENCE TO RELATED APPLICATIONS

This application is based upon and claims the benefit of priority from the prior Japanese Patent Application No. 2016-173996, filed on Sep. 6, 2016, the entire contents of which are incorporated herein by reference.

FIELD

Embodiments of the present disclosure relate to a receiver and a radio communication device.

BACKGROUND

A most typical method of detecting whether a radio signal is present is envelop detection. In a typical method of implementing the envelop detection, an input signal is squared or calculates the absolute value of the input signal, and then filtered by a low pass filter. When the time constant of the low pass filter is sufficiently large, most of the high-frequency component of the input signal can be removed and an output signal that has been smoothed can be acquired. Therefore, the signal that has been smoothed and an arbitrary reference signal are compared in intensity so that whether the signal is present can be determined.

However, when the amplitude of the input signal considerably varies, the envelop detection is performed with the low pass filter having a time constant sufficiently large so that the output signal level of the low pass filter decreases and the detection accuracy of a reception signal degrades.

DETAILED DESCRIPTION

According to one embodiment, a receiver has:
a receiving unit to receive a radio signal;
a signal detector to detect a reception signal in each of a plurality of set periods shifted in time to be overlapped in a partial period, from an output signal of the receiving unit; and
a demodulating unit to perform demodulation processing based on the reception signal detected by the signal detector,
wherein the signal detector has:
a smoothing unit to smooth the output signal of the receiving unit in each of the plurality of set periods;
a comparing unit to output a signal obtained by comparing a level of the smoothed signal, with a threshold value; and
an initializing unit to initialize the signal smoothed by the smoothing processing unit, every time the comparing unit compares the smoothed signal with the threshold value, and
the demodulating unit performs the demodulation processing based on the smoothed signal determined to be the threshold value or more by the comparing unit.

Embodiments of the present disclosure will be described below with reference to the drawings.

First Embodiment

Figure 1:
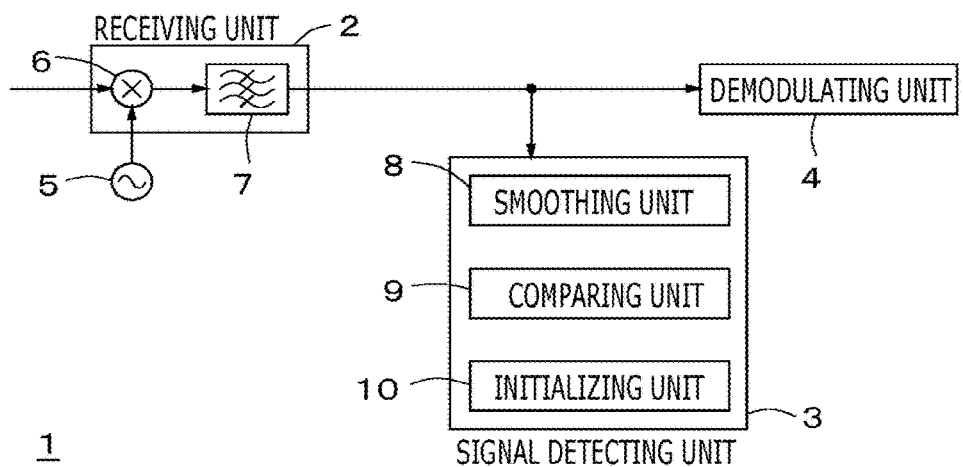
FIG. 1 is a block diagram of a schematic configuration of a receiver according to a first embodiment.

FIG. 1 is a block diagram showing a schematic configuration of a receiver 1 according to a first embodiment. The receiver 1 in FIG. 1 includes a receiving unit 2, a signal detecting unit 3, and a demodulating unit 4.

The receiving unit 2 receives a radio signal. The frequency band and modulating method of the radio signal are not particularly limited. The receiving unit 2 includes a local oscillator 5, a mixer 6, and a low pass filter (LPF) 7. The mixer 6 mixes the radio signal and a local oscillation signal together to generate a baseband signal. The low pass filter 7 removes an unnecessary frequency component included in the baseband signal.

The signal detecting unit 3 detects a reception signal, in each of a plurality of set periods when timing is shifted so that a partial period is overlapped, from an output signal of the receiving unit 2. A method of setting the period will be described later. A detailed configuration of the signal detecting unit 3 will be described. The demodulating unit 4 performs demodulation processing based on the reception signal detected by the signal detecting unit 3.

The signal detecting unit 3 includes a smoothing unit 8, a comparing unit 9, and an initializing unit 10. The smoothing unit 8 smooths the output signal of the receiving unit 2 in each of the plurality of set periods. Note that, the number of the set periods is not particularly limited. The comparing unit 9 outputs a signal in which the level of the smoothed signal is compared to a threshold value. In more detailed, the comparing unit 9 outputs the smoothed signal having the level of the threshold value or more. For example, when the number of the smoothed signals having the level of the threshold value or more is at least two, the comparing unit 9 outputs a maximum signal from the signals. The initializing unit 10 initializes the signal smoothed by the smoothing unit 8, every time the comparing unit 9 compares the signal smoothed to the threshold value. The demodulating unit 4 performs the demodulation processing based on the signal output from the comparing unit 9. More specifically, the demodulating unit 4 performs the demodulation processing with the smoothed signal determined to be the threshold value or more by the comparing unit 9.

Figure 2:
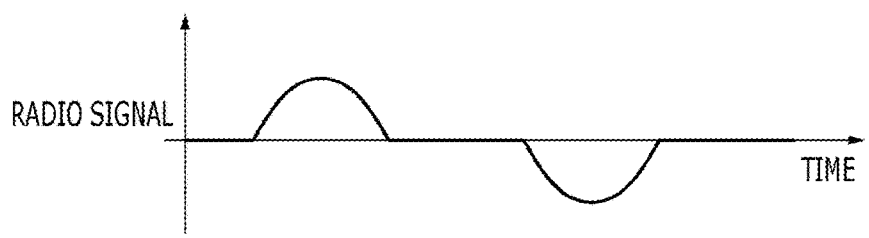
FIG. 2 is a waveform chart of an exemplary sporadic variation of the signal level of a radio signal to be received.
Figure 3:
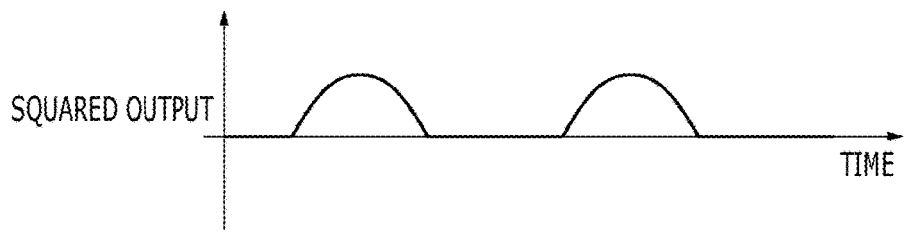
FIG. 3 is a waveform chart of a squared output signal.
Figure 4:
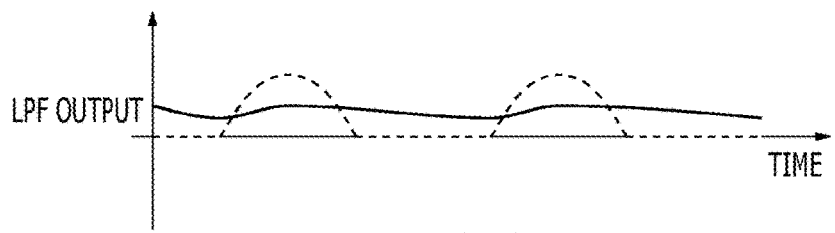
FIG. 4 is a waveform chart of the squared output signal that has been smoothed.

FIGS. 2 to 7 are waveform charts for describing the plurality of set periods set by the signal detecting unit 3. FIG. 2 exemplifies a sporadic variation of the signal level of the received radio signal. A squared output signal of the radio signal is, as illustrated in FIG. 3, a signal including the variation of the signal level expressed as an absolute value. When the squared output signal passes through the low pass filter 7 for the smoothing processing, as indicated with a solid curve in FIG. 4, the signal level decreases so that the detection accuracy of the reception signal degrades.

Figure 5:
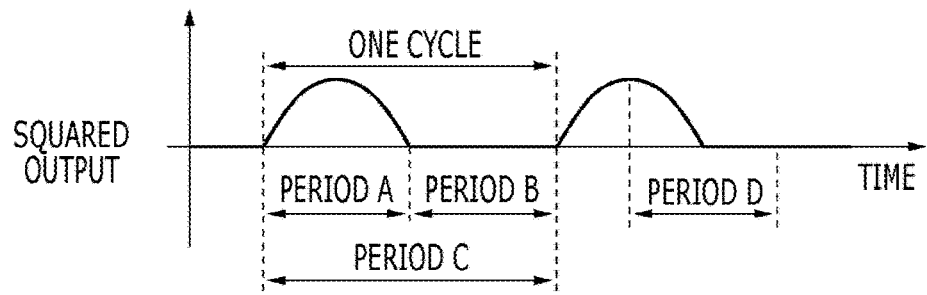
FIG. 5 is a waveform chart of exemplary performance of smoothing in a partial section in one cycle of the squared output signal.

FIG. 5 exemplifies the performance of the smoothing in a partial period in one cycle of the squared output signal. For example, the signal level of the squared output signal is zero or more in period A so that the level of the smoothed signal increases. Meanwhile, the signal level of the squared output signal is zero in period B so that the level of the smoothed signal is zero. The level of the smoothing signal in period C including periods A and B together is approximate half of the level of the smoothed signal in period A.

In this manner, the example of FIG. 5 clarifies that the smoothing is performed in period A so that the level of the reception signal increases in a maximum. However, time at which the amplitude of the radio signal to be received is large is unknown in practice. Thus, according to the present embodiment, the set periods to which the smoothing is performed, are shifted partially overlapping, and the smoothing is performed to each of the set periods so that a set period in which the level of the reception signal is the threshold value or more is searched. According to the present embodiment, specifying the set periods to perform the smoothing is referred to as signal detection sub-processing.

Figure 6:
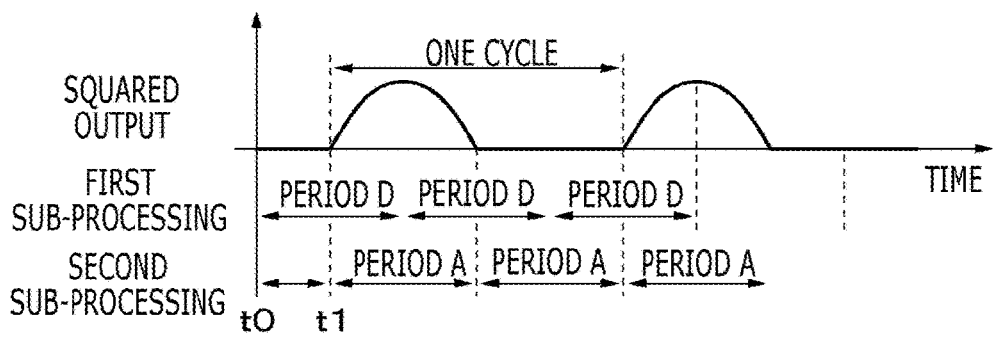
FIG. 6 is a waveform chart of the smoothing performed by two pieces of signal detection sub-processing.

FIG. 6 is a waveform chart exemplifying the smoothing performed by two pieces of the signal detection sub-processing (hereinafter, referred to as first sub-processing and second sub-processing). The first sub-processing performs the smoothing every period D from time t0. The second sub-processing performs the smoothing every period A from time t1 at which predetermined time has passed from time t0. FIG. 6 exemplifies that the predetermined time from time t0 to time t1 is set to be a quarter of the cycle of the radio signal.

First period D in the first sub-processing shifts with respect to a period during which the signal level of the squared output signal is zero or more so that the signal level of the smoothed signal does not increase much. Meanwhile, first period A in the second sub-processing corresponds to the period during which the signal level of the squared output signal is zero or more so that the signal level of the smoothed signal becomes maximum. In this manner, since the set periods for the smoothing processing is shifted while being partially overlapped, it is possible to relatively easily detect the set period so that the level of the reception signal becomes as large as possible.

Figure 7:
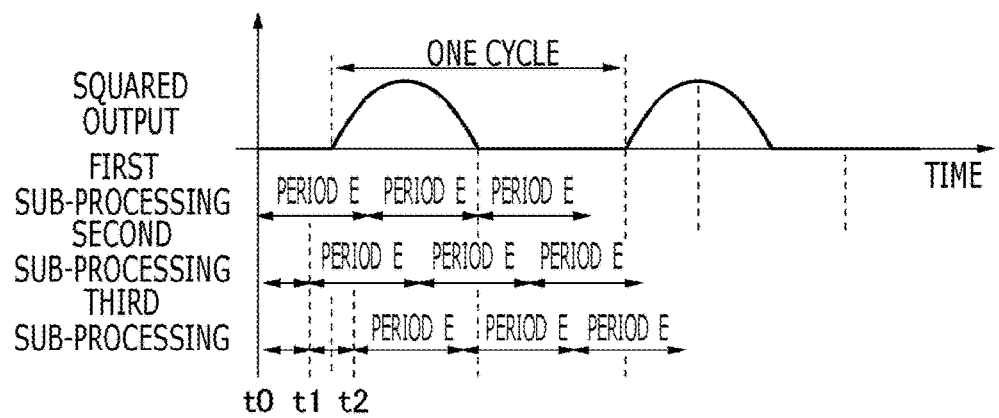
FIG. 7 is a waveform chart of the smoothing performed by three pieces of the signal detection sub-processing.

FIG. 7 is a waveform chart exemplifying the smoothing processing performed by three pieces of the signal detection sub-processing (hereinafter, referred to as the first to third sub-processing). The first sub-processing performs the smoothing processing every period E from time t0. The second sub-processing performs the smoothing processing every period E from time t1 shifted by first time from time t0. The third sub-processing performs the smoothing processing every period E from time t2 shifted by second time from time t1. The length of period E is shorter than half of the cycle of the radio signal. Each period in the first to third sub-processing partially overlaps. In FIG. 7, the level of the reception signal detected in first period E in the third sub-processing becomes maximum. In this manner, when the number of pieces of the sub-processing increases, a section in which the level of the reception signal is maximum is easily selected. When the number of pieces of the sub-processing is small, a plurality of the cycles of the radio signal is required to optimize an amount of shifting a section in each of the pieces of the sub-processing so that prompt reception processing is difficult to perform.

In this manner, the signal detecting unit 3 according to the present embodiment, prepares the plurality of the set periods mutually shifted while being partially overlapped, smooths the reception signal in each of the set periods, and detects a signal including the level of the reception signal having the level of the threshold value or more in the plurality of the set periods.

Figure 8:
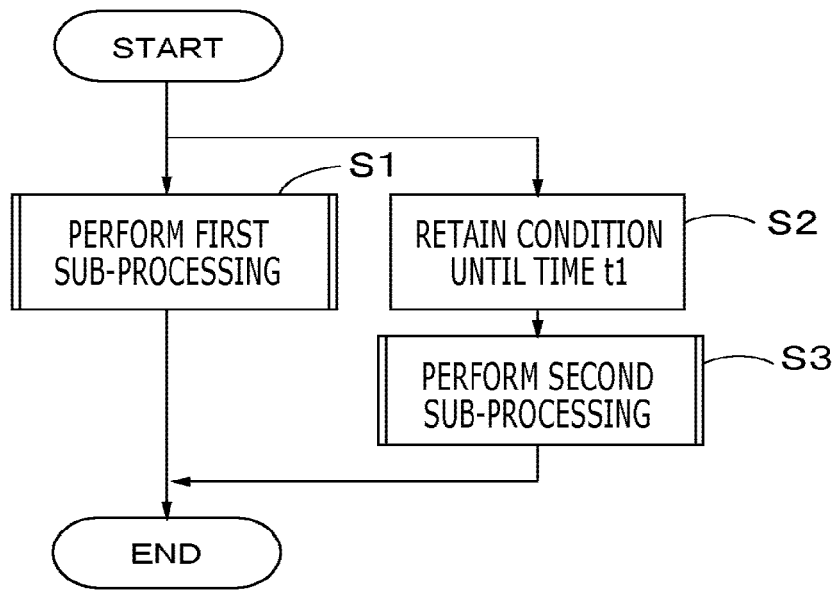
FIG. 8 is a flow chart of a process of signal detection processing performed by the receiver in FIG. 1.

FIG. 8 is a flow chart of a process of the signal detection processing performed by the receiver 1 in FIG. 1. The flow chart in FIG. 8 shows an example having the first sub-processing and the second sub-processing provided. First, the first sub-processing starts at time t0 (step S1). After that, the condition remains until time t1 (step S2) and then the second sub-processing starts (step S3). As a result of the first sub-processing and the second sub-processing, a signal including the level of the reception signal exceeding the threshold value, is finally output. The signal is, as to be described later, input to the demodulating unit 4 so that the demodulation processing is performed.

Figure 9:
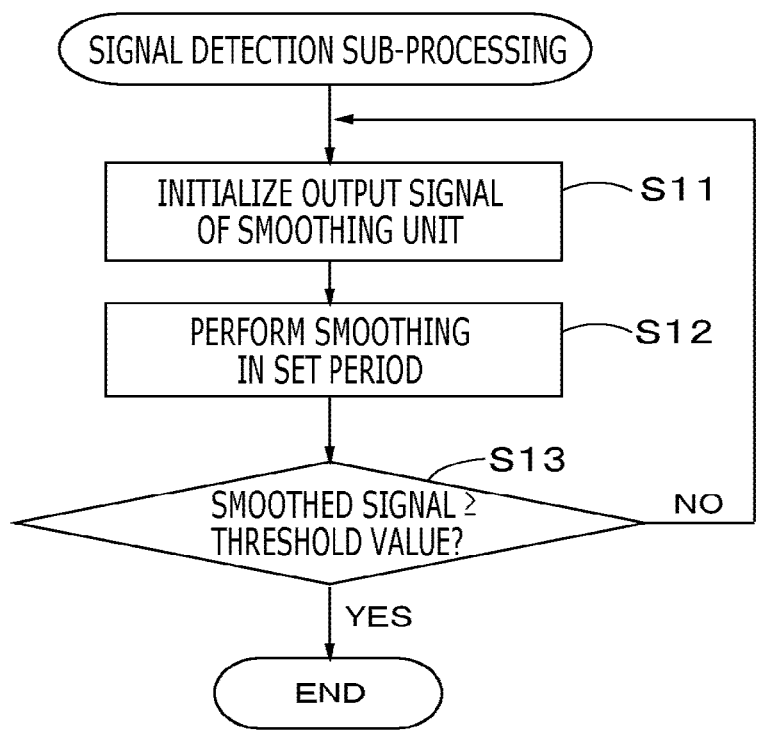
FIG. 9 is a flow chart of a detailed process of first sub-processing and second sub-processing in FIG. 8.

The first sub-processing at step S1 has the same specific predetermined process as that of the second sub-processing at step S3 in FIG. 8. FIG. 9 is a flow chart showing detailed processes of the first sub-processing and the second sub-processing in FIG. 8. First, the initializing unit 10 initializes an output signal of the smoothing processing unit 8 (step S11). Next, the smoothing processing unit 8 performs the smoothing processing to the reception signal in each set period in the first sub-processing or the second sub-processing to generate the smoothed signal (step S12). Next, the comparing unit 9 determines whether the smoothed signal is the threshold value or more (step S13). When the smoothed signal is determined to be the threshold value or more, it is determined that the signal has been detected so that the processing in FIG. 9 is completed. When the smoothed signal is determined to be less than the threshold value, it is determined that the signal has not been detected so that the processing goes back to step S11.

In this manner, according to the first embodiment, since timing when the reception signal is detected is unknown, the plurality of the set periods shifted in time while being overlapped in the partial period is prepared and the reception signal is smoothed in each of the set periods to compare the smoothed reception signal with the threshold value so that it is possible to set the level of the smoothed reception signal as large as possible. Therefore, noise tolerance improves and detection accuracy with respect to the reception signal improves.

Second Embodiment

According to a second embodiment, a threshold value is adjusted in response to a noise signal included in a radio signal.

Figure 10:
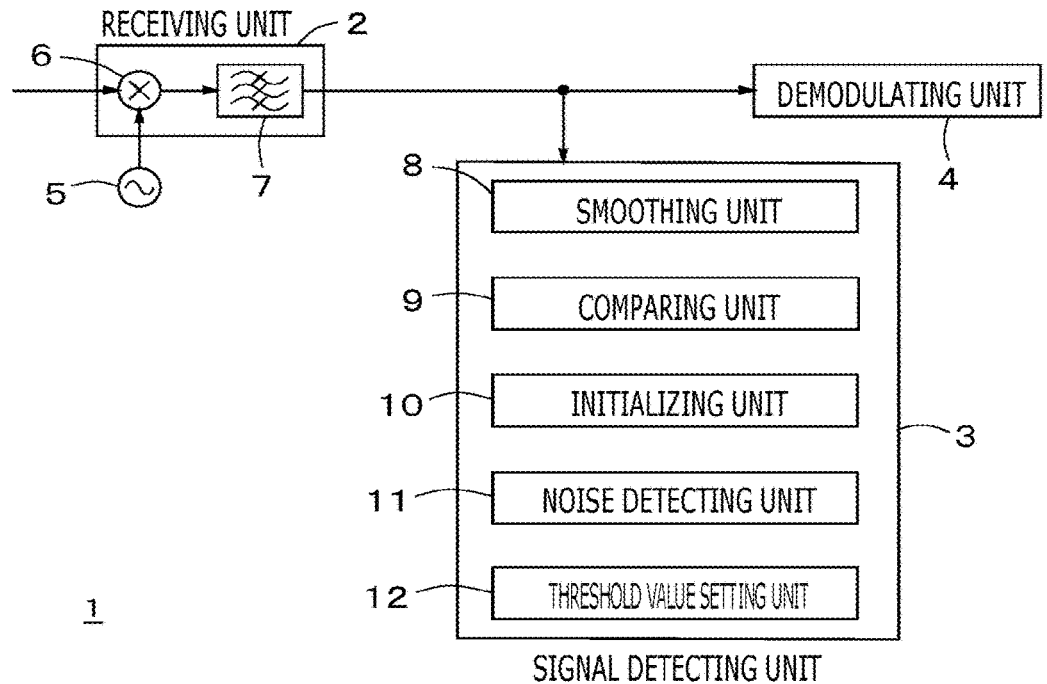
FIG. 10 is a block diagram of a schematic configuration of a receiver according to a second embodiment.

FIG. 10 is a block diagram showing a schematic configuration of a receiver 1 according to the second embodiment. In FIG. 10, components in common with FIG. 1 are denoted with the same reference signs, and differences will be mainly described below. The receiver 1 in FIG. 10 includes a noise detecting unit 11 and a threshold value setting unit 12 inside a signal detecting unit 3. Except that, the receiver 1 in FIG. 10 is in common with the receiver 1 in FIG. 1.

The noise detecting unit 11 detects the noise signal. The threshold value setting unit 12 sets the threshold value based on the noise signal.

A receiving unit 2 includes an analog circuitry, and the receiving unit 2 performs amplification processing and filtering. The analog circuitry has thermal noise so that a noise signal of the analog circuitry is superimposed on an output signal of the receiving unit 2. When the radio signal that has been received is minute, the radio signal is difficult to distinguish from noise so that there is a risk that the signal detecting unit 3 malfunctions due to the noise. Therefore, according to the present embodiment, the noise detecting unit 11 detects the noise signal occurring in the receiving unit 2 before the radio signal is input. The detection of the noise signal can be calculated by calculation processing. More specifically, the noise detecting unit 11 calculates the average and standard deviation of the noise signal. Note that, when the average of the noise signal is known or can be estimated without the calculation, the value may be acquired without the calculation.

The threshold value setting unit 12 multiplies the acquired standard deviation, by an arbitrary coefficient, and adds the average to the standard deviation multiplied by the arbitrary coefficient to generate the threshold value. The threshold value is assumed to be a value that the noise signal is superimposed. A case where a comparing unit 9 clarifies that a smoothed signal is the threshold value or more, indicates that a signal having a signal level larger than the noise has been detected. Therefore, the level of the reception signal in intensity can be determined substantially without influence of the noise.

Figure 11:
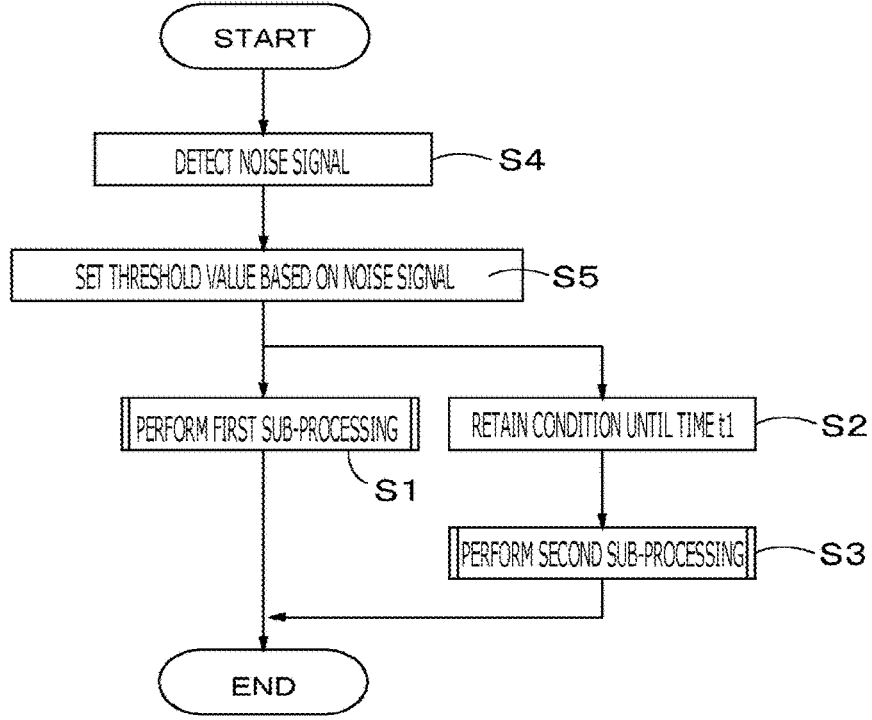
FIG. 11 is a flow chart of a process of signal detection processing performed by the receiver according to the second embodiment.

FIG. 11 is a flow chart of a process of signal detection processing performed by the receiver 1 according to the second embodiment. First, the noise detecting unit 11 detects the noise signal (step S4). Next, the threshold value setting unit 12 sets the threshold value based on the noise signal that has been detected (step S5). After that, the same processings as those at steps S1 to S3 in FIG. 8 are performed to detect the signal.

In this manner, according to the second embodiment, the threshold value to be compared to the smoothed signal by the comparing unit 9, is set to a value in accordance with the noise so that the signal detection can be performed without the influence of the noise.

Third Embodiment

Figure 12:
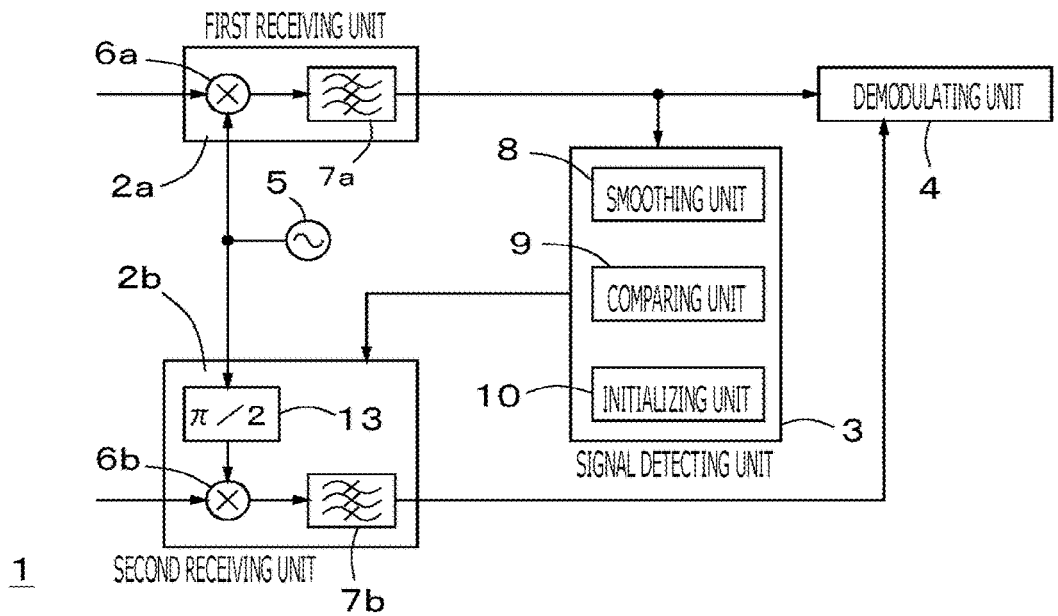
FIG. 12 is a block diagram of a schematic configuration of a receiver according to a third embodiment.

FIG. 12 is a block diagram showing a schematic configuration of a receiver 1 according to a third embodiment. The receiver 1 in FIG. 12 includes a first receiving unit 2a that performs reception processing to an I signal, a second receiving unit 2b that performs reception processing to a Q signal, a signal detecting unit 3, and a demodulating unit 4.

The first receiving unit 2a includes a local oscillator 5, a first mixer 6a, and a first filter 7a. The local oscillator 5 generates a first local oscillation signal for receiving the I signal. The first mixer 6a mixes a radio signal and the first local oscillation signal together to generate a first baseband signal. The first filter 7a removes an unnecessary frequency component included in the first baseband signal.

The second receiving unit 2b includes a phase shifter 13, a second mixer 6b, and a second filter 7b. The phase shifter 13 generates a second local oscillation signal having a phase shifted from the phase of the first local oscillation signal by 90°. The second mixer 6b mixes the radio signal and the second local oscillation signal together to generate a second baseband signal. The second filter 7b removes an unnecessary frequency component included in the second baseband signal. The first receiving unit 2a and the second receiving unit 2b each perform the reception processing with an analog signal.

Figure 13:
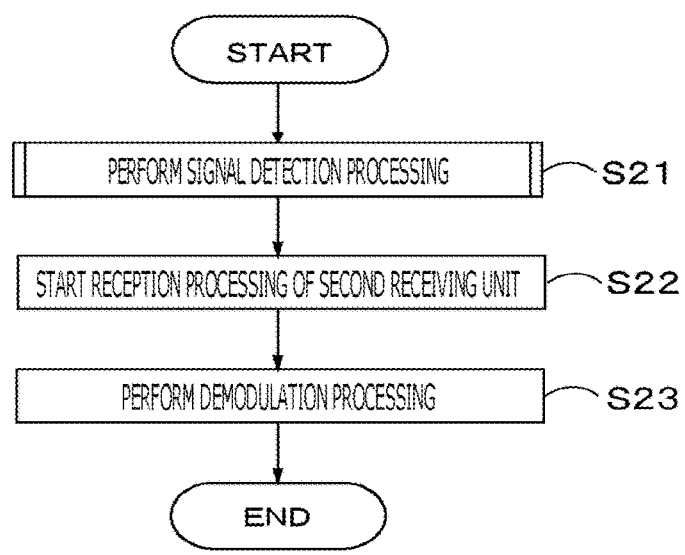
FIG. 13 is a flow chart of a processing operation of the receiver in FIG. 12.

FIG. 13 is a flow chart of a processing operation of the receiver 1 in FIG. 12. First, the first receiving unit 2a receives the radio signal, and a first signal detecting unit 3a performs signal detection processing (step S21). The signal detection processing at step S21 is performed in the same processes as those in FIGS. 8 and 9.

When the signal is detected at step S21, the second receiving unit 2b starts the reception processing (step S22). Next, demodulation processing is performed to the signal received by at least one of the first receiving unit 2a and the second receiving unit 2b (step S23).

In this manner, according to the third embodiment, the second receiving unit 2b does not start the reception processing until the first receiving unit 2a detects the signal, so that the power consumption of the second receiving unit 2b can be reduced.

Fourth Embodiment

A fourth embodiment has a technical feature in which a first receiving unit 2a and a second receiving unit 2b are used to prevent mal-detection of a signal due to noise.

Figure 14:
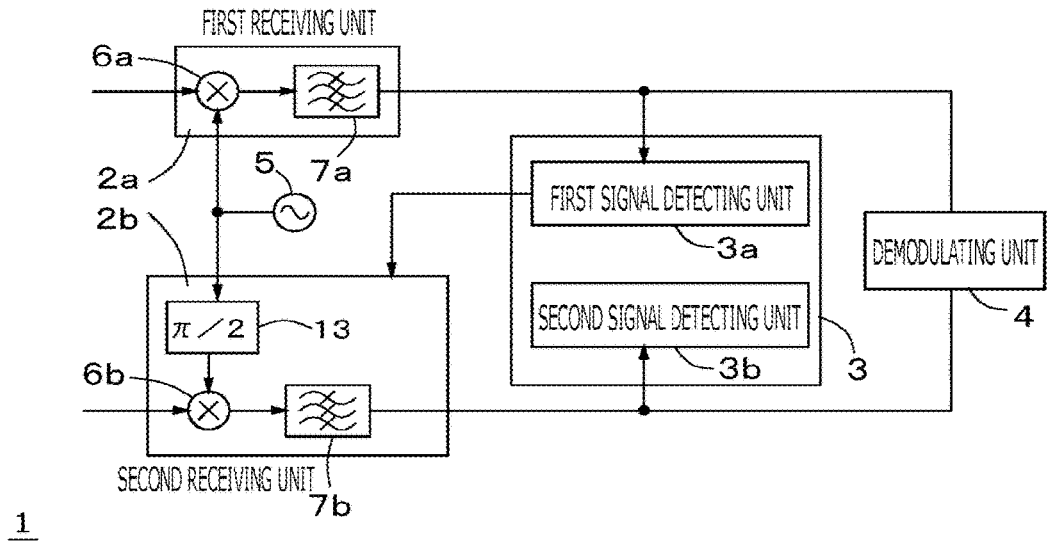
FIG. 14 is a block diagram of a schematic configuration of a receiver according to a fourth embodiment.

FIG. 14 is a block diagram showing a schematic diagram showing a receiver 1 according to the fourth embodiment. The receiver 1 in FIG. 14 is different from the receiver 1 in FIG. 12 in terms of the internal configuration of a signal detecting unit 3. The signal detecting unit 3 in the receiver 1 in FIG. 14 includes a first signal detecting unit 3a that detects a reception signal from an output signal of the first receiving unit 2a, and a second signal detecting unit 3b that detects the reception signal from an output signal of the second receiving unit 2b. The first signal detecting unit 3a and the second signal detecting unit 3b each include a smoothing unit 8, a comparing unit 9, and an initializing unit 10, similarly to FIG. 1.

The schematic configuration of the receiver 1 according to the fourth embodiment is the same as that in FIG. 12, and thus the descriptions thereof will be omitted. According to the third embodiment, the second receiving unit 2b starts the reception processing when the signal detecting unit 3 detects the signal. However, under circumferences where a large quantity of the noise is present, the first signal detecting unit 3a may wrongly perform the signal detection to the noise. Therefore, according to the fourth embodiment, only when the first signal detecting unit 3a detects the signal and then the second signal detecting unit 3b also detects the signal, demodulation processing is performed.

Figure 15:
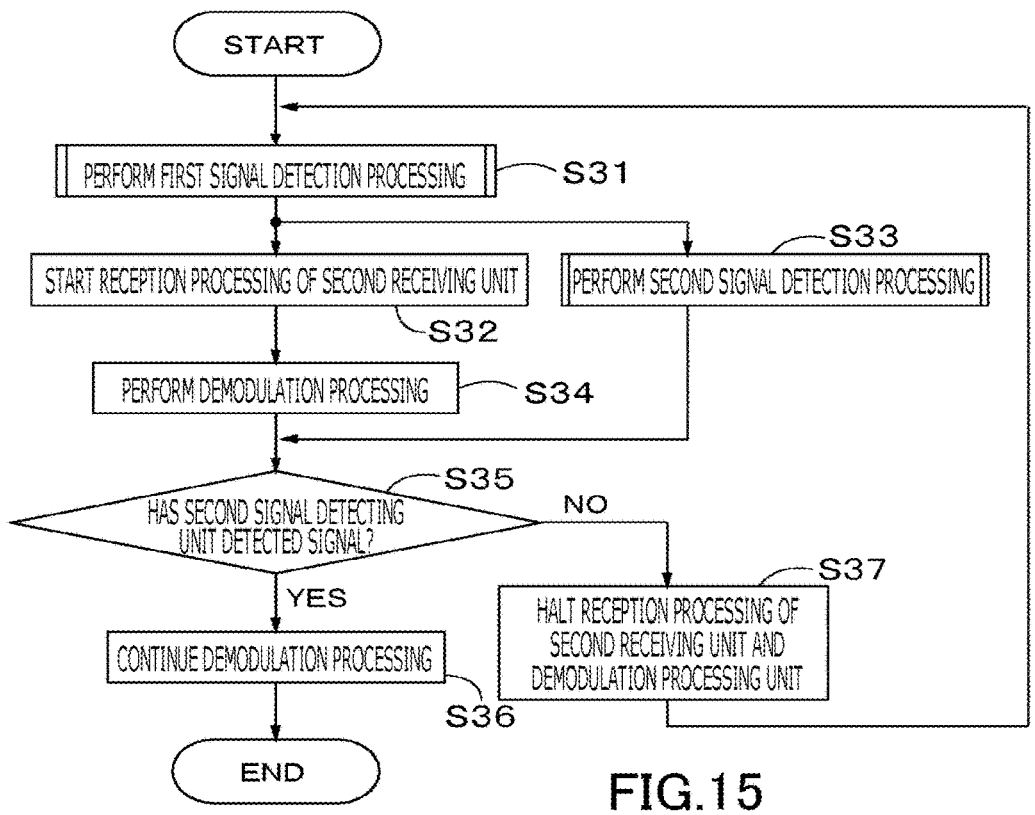
FIG. 15 is a flow chart of a process of signal detection processing performed by the receiver according to the fourth embodiment.

FIG. 15 is a flow chart of a process of signal detection processing performed by the receiver 1 according to the fourth embodiment. First, the first receiving unit 2a and the first signal detecting unit 3a are used to perform the signal detection processing (step S31). The signal detection processing at step S31 is performed in the same processes as those in FIGS. 8 and 9.

When the signal is detected at step S31, the second receiving unit 2b starts reception processing (step S32), and the second signal detecting unit 3b performs signal detection processing (step S33). The processing at step S33 is performed in the same processes as those in FIGS. 8 and 9.

A demodulating unit 4 performs demodulation processing to the signal detected at step S31 in parallel with the processing at step S33 (step S34).

Next, it is determined whether the second signal detecting unit 3b has detected the signal (step S35), and the demodulating unit 4 continues to perform the demodulation processing when the signal has been detected (step S36). When the signal has not been detected, the second receiving unit 2b cancels the reception processing and additionally the demodulating unit 4 cancels the demodulation processing (step S37). Then, the processing goes back to step S31 in order for the first signal detecting unit 3a to perform the signal detection processing again.

Figure 16:
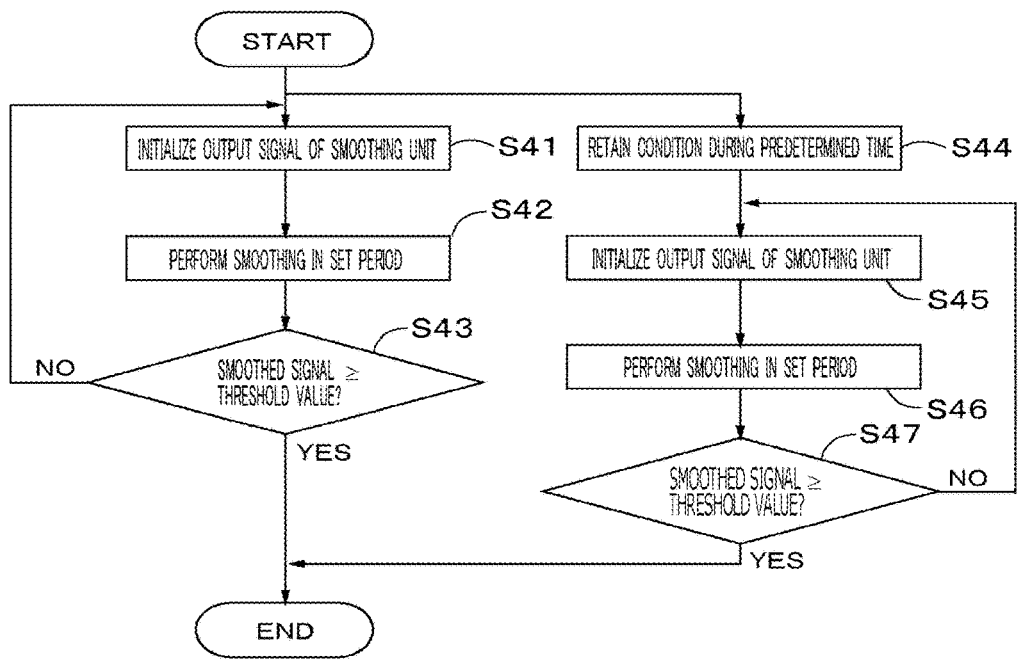
FIG. 16 is a flow chart of a process of signal detection processing of a second signal detecting unit at step S33 in FIG. 15.

FIG. 16 is a flow chart of a process of the signal detection processing of the second signal detecting unit 3b at step S33 in FIG. 15. The flow chart indicates the performance of first sub-processing and second sub-processing with set periods mutually shifted overlapping in a partial period. First, during the first sub-processing, an output signal of the smoothing processing unit 8 in the second signal detecting unit 3b is initialized (step S41), and then smoothing is performed in each set period of the first sub-processing (step S42). Then, whether a smoothed signal is a threshold value or more is determined (step S43). When the smoothed signal is less than the threshold value, pieces of the processing at steps S41 to S43 are repeated. When the smoothed signal is the threshold value or more, the processing in FIG. 16 is completed.

Meanwhile, during the second sub-processing, after predetermined time has passed since the start of the first sub-processing (step S44), an output signal of the smoothing processing unit 8 in the second signal detecting unit 3b is initialized (step S45), and then smoothing is performed in each set period of the second sub-processing (step S46). Then, it is determined whether a smoothed signal is the threshold value or more (step S47). When the smoothed signal is less than the threshold value, pieces of the processing at steps S45 to S47 are repeated. When the smoothed signal is the threshold value or more, the processing in FIG. 16 is completed.

In this manner, according to the fourth embodiment, only when the first signal detecting unit 3a detects the signal and then the second signal detecting unit 3b also detects the signal, the demodulation processing continues. Therefore, when the signal detection is wrongly performed to the noise as the reception signal, the demodulation processing does not continue so that waste power consumption can be reduced.

Fifth Embodiment

A fifth embodiment has a technical feature in which synchronization between a signal to be transmitted and a signal to be received, is achieved.

Figure 17:
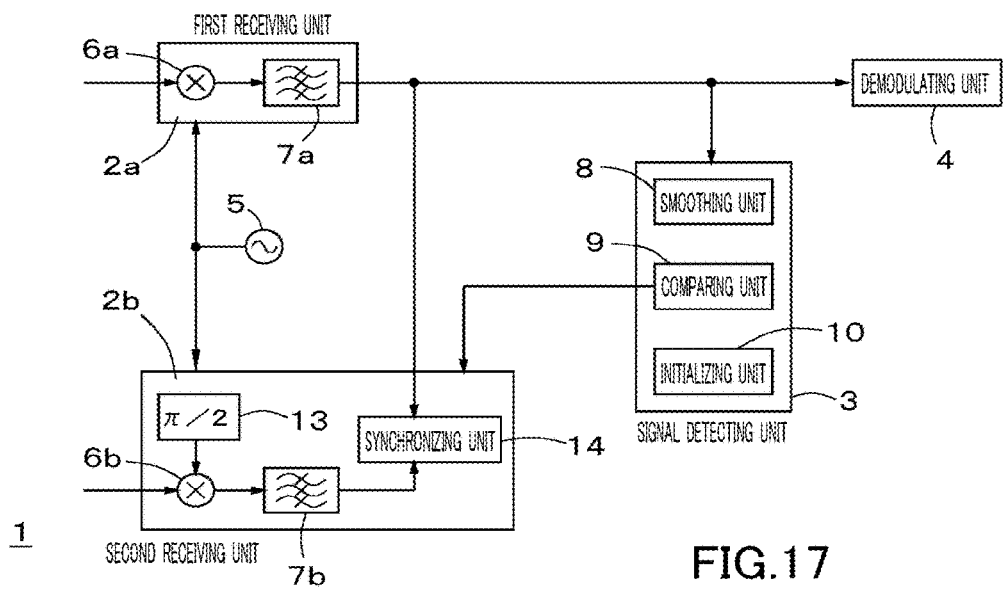
FIG. 17 is a block diagram of a schematic configuration of a receiver according to a fifth embodiment.

FIG. 17 is a block diagram showing a schematic configuration of a receiver 1 according to the fifth embodiment. The receiver 1 in FIG. 17 includes a synchronizing unit 14 added to the receiver 1 in FIG. 12. In performing radio communication between a transmitter and the receiver 1, the synchronizing unit 14 performs the processing of synchronizing the reference clock of the transmitter and the reference clock of the receiver 1 (hereinafter, referred to as synchronization processing).

Figure 18:
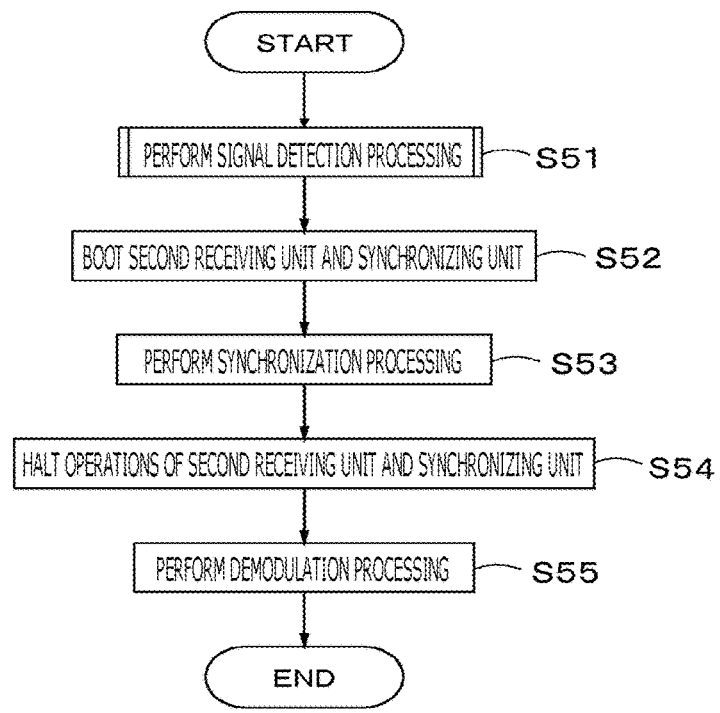
FIG. 18 is a flow chart of a process performed by the receiver according to the fifth embodiment.

FIG. 18 is a flow chart of a process performed by the receiver 1 according to the fifth embodiment.

First, a first receiving unit 2a and a first signal detecting unit 3a are used to perform signal detection processing (step S51). The processing at step S51 is performed in the same processes as those in FIGS. 8 and 9. Next, the operation of a second receiving unit 2b and the operation of the synchronizing unit 14 start (step S52). Next, the synchronizing unit 14 performs the synchronizing processing to a signal detected by the first signal detecting unit 3a (step S53). Both the first receiving unit 2a and the second receiving unit 2b are used to perform the synchronizing processing.

When the synchronizing processing is completed, the operation of the second receiving unit 2b and the operation of the synchronizing unit 14 are halted (step S54), and a demodulating unit 4 performs demodulation processing to the signal detected by the first signal detecting unit 3a (step S55).

In this manner, according to the fifth embodiment, the synchronizing unit 14 that synchronizes the reception timing of the receiver 1 with the transmission timing of the transmitter, is provided. When the first signal detecting unit 3a detects the signal, the second receiving unit 2b and the synchronizing unit 14 operate only during the synchronizing processing so that power consumed by the second receiving unit 2b and the synchronizing unit 14 can be inhibited at a minimum.

Sixth Embodiment

A sixth embodiment has a technical feature in which whether mal-detection of a signal due to noise has occurred is ascertained to determine whether synchronization processing continues.

Figure 19:
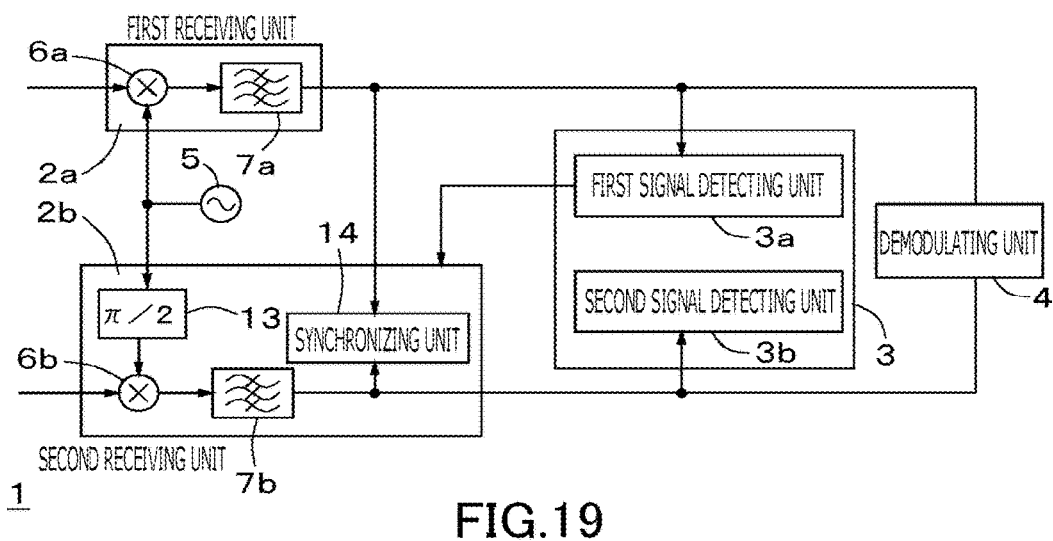
FIG. 19 is a block diagram of a schematic diagram of a receiver according to a sixth embodiment.

FIG. 19 is a block diagram showing a schematic configuration of a receiver 1 according to the sixth embodiment. The receiver 1 in FIG. 19 includes a synchronizing unit 14 added to the receiver 1 in FIG. 14.

According to the sixth embodiment, when a first signal detecting unit 3a detects a signal, the operation of a second receiving unit 2b and the operation of the synchronizing unit 14 start, similarly to the fifth embodiment. However, there is a risk that the first signal detecting unit 3a wrongly detects the noise as the reception signal. Thus, a second signal detecting unit 3b also performs signal detection processing. Only when the second signal detecting unit 3b detects the signal, the synchronization processing continues.

Figure 20:
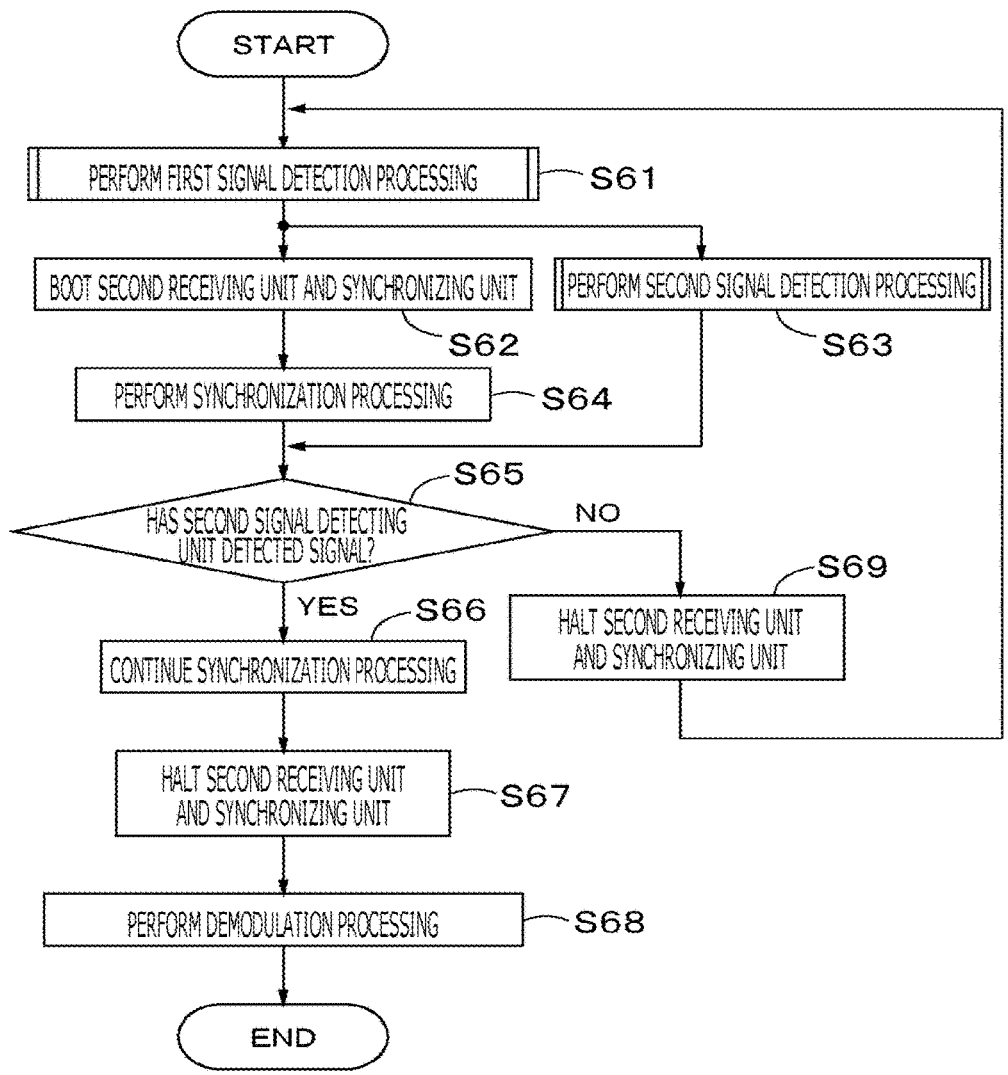
FIG. 20 is a flow chart of a process performed by the receiver according to the sixth embodiment.

FIG. 20 is a flow chart of a process performed by the receiver 1 according to the sixth embodiment. First, a first receiving unit 2a and the first signal detecting unit 3a are used to perform the signal detection processing (step S61). When the signal is detected, the second receiving unit 2b and the synchronizing unit 14 boot (step S62) so that the second signal detecting unit 3b performs the signal detection processing (step S63) and additionally the synchronizing unit 14 performs the synchronization processing (step S64).

After that, it is determined whether the second signal detecting unit 3b has detected the signal (step S65). When the signal has been detected, the synchronizing unit 14 continues the synchronization processing (step S66). When the synchronization processing is completed, the operation of the second receiving unit 2b and the operation of the synchronizing unit 14 are halted (step S67). After that, a demodulating unit 4 performs demodulation processing (step S68).

Meanwhile, when it is determined that the second signal detecting unit 3b has not detected the signal, at step S65, the operation of the second receiving unit 2b and the operation of the synchronizing unit 14 are halted (step S69) and then the processing goes back to step S61.

In this manner, according to the sixth embodiment, when the first signal detecting unit 3a detects the signal, the second receiving unit 2b and the synchronizing unit 14 operates, and additionally the second signal detecting unit 3b performs the signal detection processing. Then, only when the second signal detecting unit 3b detects the signal, the synchronizing unit 14 continues the synchronization process and the demodulating unit 4 performs the demodulation processing. Therefore, similarly to a case where the first signal detecting unit 3a wrongly detects the signal due to the noise, when the second signal detecting unit 3b detects no signal, the operations of the second receiving unit 2b, the synchronizing unit 14, and the demodulating unit 4 are halted so that power consumption can be reduced.

Seventh Embodiment

Figure 21:
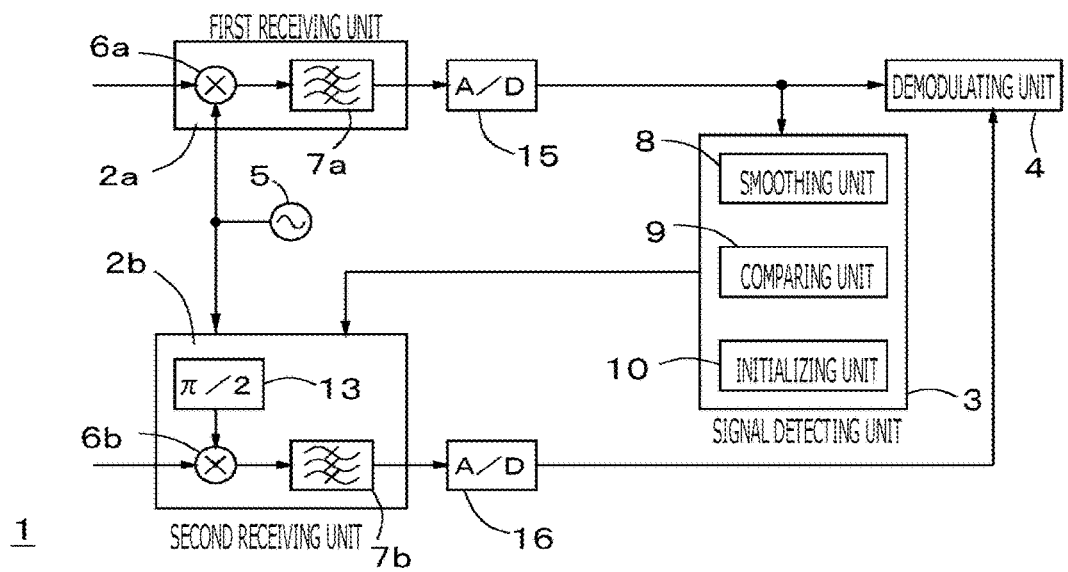
FIG. 21 is a block diagram of a schematic configuration of a receiver according to a seventh embodiment.

FIG. 21 is a block diagram showing a schematic configuration of a receiver 1 according to a seventh embodiment. The receiver 1 in FIG. 21 includes a first A/D converter 15 and a second A/D converter 16 added to the receiver 1 in FIG. 12. The first A/D converter 15 converts an output signal of a first receiving unit 2a into a digital signal. The second A/D converter 16 converts an output signal of a second receiving unit 2b into a digital signal. A signal detecting unit 3 performs signal detection processing based on the output signal of the first A/D converter 15. A demodulating unit 4 performs demodulation processing based on the digital signal output any one of the first A/D converter 15 and the second A/D converter 16.

In this manner, according to the seventh embodiment, the signal detection processing and the demodulation processing are performed with the digital signal so that the accuracy of each of the signal detection processing and the demodulation processing can improve.

Eighth Embodiment

Figure 22:
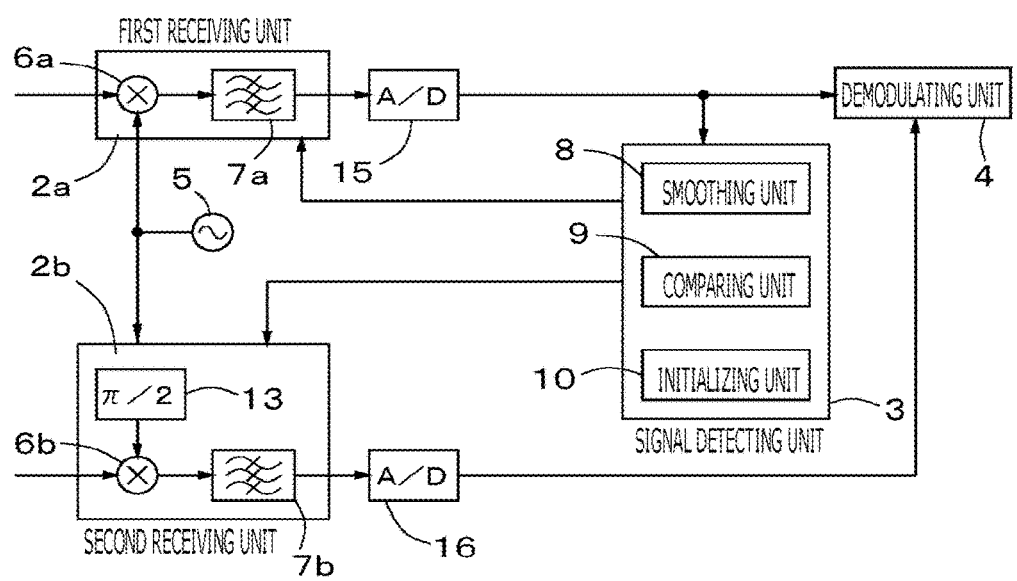
FIG. 22 is a block diagram of a schematic configuration of a receiver according to an eighth embodiment.

FIG. 22 is a block diagram showing a schematic configuration of a receiver 1 according to an eighth embodiment. The receiver 1 in FIG. 22 has a configuration similar to that of the receiver 1 in FIG. 21, but a first receiving unit 2a and a first A/D converter 15 in the receiver 1 of FIG. 22 are capable of varying processing accuracy. Before a signal detecting unit 3 detects a signal, power consumption is reduced by degrading the filtering performance of a first filter 7a in the first receiving unit 2a or by degrading the A/D conversion accuracy of the first A/D converter 15. When the signal detecting unit 3 detects the signal, a second receiving unit 2b operates and additionally the processing accuracy of each of the first receiving unit 2a and the first A/D converter 15 improves so that demodulation processing is performed with high precision. Accordingly, the power consumption can be reduced with demodulation accuracy not degrading.

Ninth Embodiment

Figure 23:
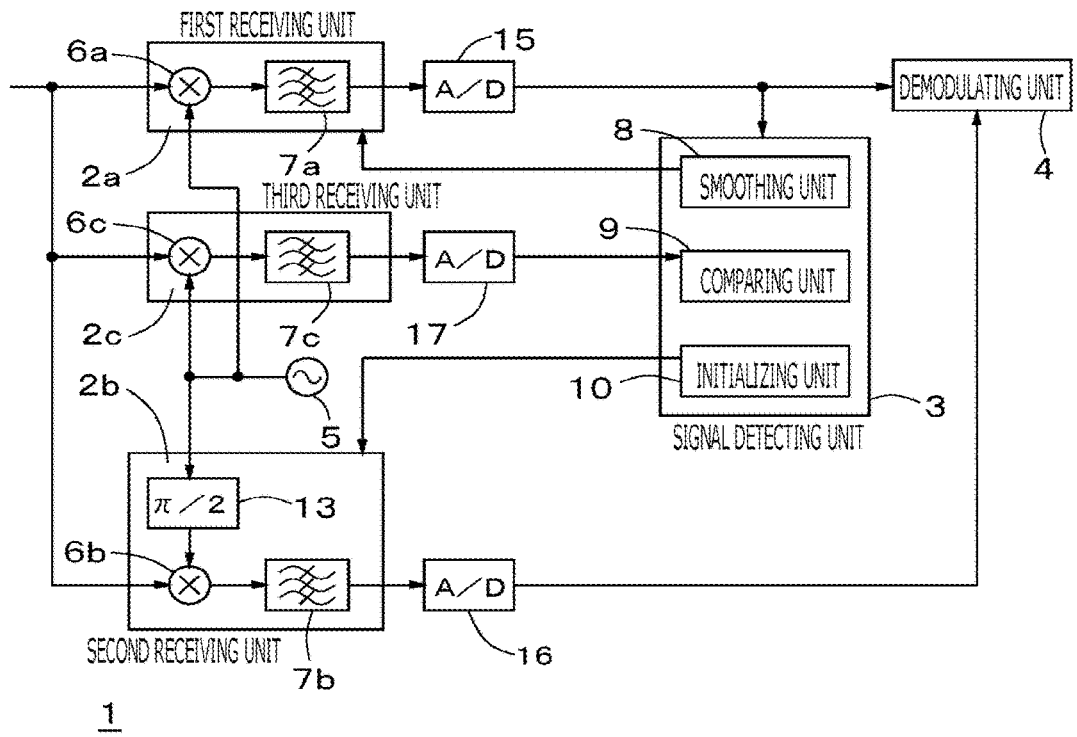
FIG. 23 is a block diagram of a schematic configuration of a receiver according to a ninth embodiment.

FIG. 23 is a block diagram showing a schematic diagram showing a receiver 1 according to a ninth embodiment. The receiver 1 in FIG. 23 includes a third receiving unit 2c and a third A/D converter 17 in addition to the configuration of the receiver 1 in FIG. 22. The third receiving unit 2c performs third analog reception processing having accuracy essential for signal detection. The third receiving unit 2c is used to await the arrival of a signal, before a signal detecting unit 3 detects the signal.

Figure 24:
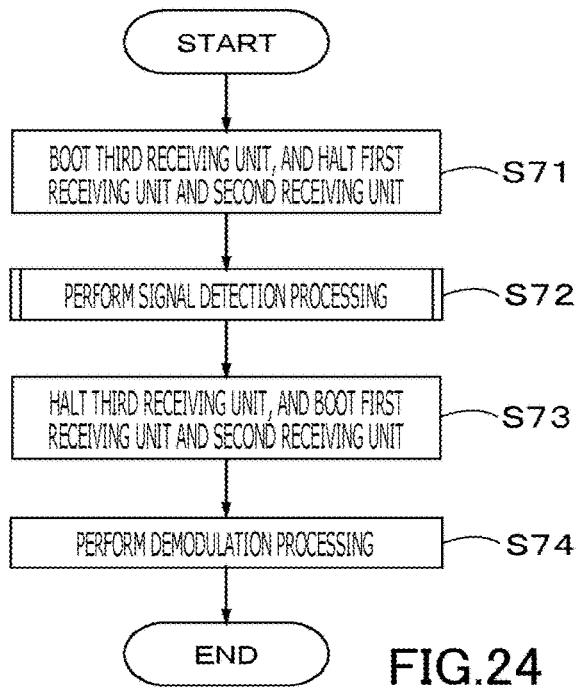
FIG. 24 is a flow chart of a process performed by the receiver according to the ninth embodiment.

FIG. 24 is a flow chart of a process performed by the receiver 1 according to the ninth embodiment.

First, before the signal is detected, the third receiving unit 2c operates in a state where the operation of a first receiving unit 2a and the operation of a second receiving unit 2b have halted (step S71), and then the signal detecting unit 3 performs signal detection processing (step S72). When the signal is detected, the first receiving unit 2a and the second receiving unit 2b operate and the third receiving unit 2c halts the operation (step S73), and then demodulation processing is performed (step S74).

According to the eighth embodiment, the processing accuracy of each of the first receiving unit 2a and the first A/D converter 15 is variable. However, making the processing accuracy variable causes a risk that the internal configuration of each of the first receiving unit 2a and the first A/D converter 15 is complicated. In contrast to this, according to the present embodiment, the third receiving unit 2c is provided for the signal detection so that the processing accuracy of each of the first receiving unit 2a and a first A/D converter 15 is not required to be varied. Thus, the entire configuration of the receiver 1 can be simplified and the total power consumption can be reduced.

Tenth Embodiment

The configuration and operation of the receiver 1 have been described in each of the first to ninth embodiments described above. In a tenth embodiment to be described below, an exemplary hardware configuration of a radio communication device including a transmitter in addition to the configuration of the receiver 1 according to any of the first to ninth embodiments, will be described. A receiver 1 in the radio communication device according to the tenth embodiment, includes any of the first to ninth embodiments described above, and thus the detailed descriptions thereof will be omitted.

Figure 25:
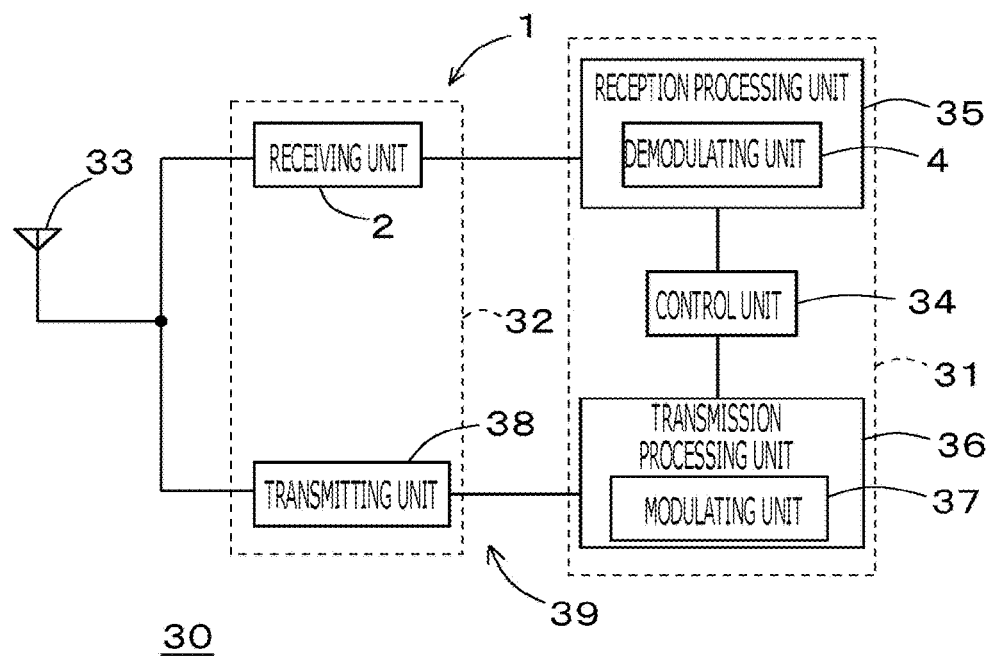
FIG. 25 is a block diagram of a schematic configuration of a radio communication device according to a tenth embodiment.

FIG. 25 is a block diagram showing a schematic configuration of the radio communication device 30 according to the tenth embodiment. The radio communication device 30 in FIG. 11 includes a baseband unit 31, an RF unit 32, and an antenna unit 33.

The baseband unit 31 includes a control unit 34, a reception processing unit 35, and a transmission processing unit 36. Each of the units inside the baseband unit 31 performs digital signal processing.

The control unit 34 performs, for example, processing of a media access control (MAC) layer. The control unit 34 may perform processing of a host network hierarchy of the MAC layer. The control unit 34 may perform processing relating to multi-input multi-output (MIMO). For example, the control unit 34 may perform, for example, propagation path estimation processing, transmission weight calculation processing, and stream separation processing.

The reception processing unit 35 includes the signal detecting unit 3 and the demodulating unit 4 illustrated, for example, in FIG. 1, and additionally performs processing of analyzing a preamble and a physical header. The transmission processing unit 36 includes a modulating unit 37 to generate a digital transmission signal.

The RF unit 32 includes the receiving unit 2 illustrated, for example, in FIG. 1 and a transmitting unit 38. The transmitting unit 38 includes a transmission filter not illustrated that extracts a signal in a transmission band, a mixer not illustrated that upconverts the signal that has passed through the transmission filter, into a radio communication frequency by using an oscillation signal of a VCO, and a preamplifier not illustrated that amplifies the signal that has been upconverted.

The receiver 1 includes the receiving unit 2 and the reception processing unit 35, and the transmitter 39 includes the transmitting unit 38 and the transmission processing unit 36. Note that, FIG. 25 illustrates an exemplary configuration of the radio communication device 30, and the internal configuration of the radio communication device 30 can be appropriately altered.

The radio communication device 30 illustrated in FIG. 25 can be applied to a stationary radio communication device 30, such as an access point, a wireless router, or a computer. The radio communication device 30 can be also applied to a portable radio terminal, such as a smartphone or a mobile phone. The radio communication device 30 can be also applied to peripheral equipment, such as a mouse or a keyboard, that performs radio communication with a host device. The radio communication device 30 can be also applied to a card-typed member including a radio function built therein. The radio communication device 30 can be also applied to a wearable terminal that performs radio communication of biological information. Various examples of a radio system of the radio communication between the radio communication devices 30 illustrated in FIG. 25, that can be applied, include, but are not particularly limited to, third generation or later cellular communication, a wireless LAN, Bluetooth (registered trademark), and near-field radio communication.

Figure 26:
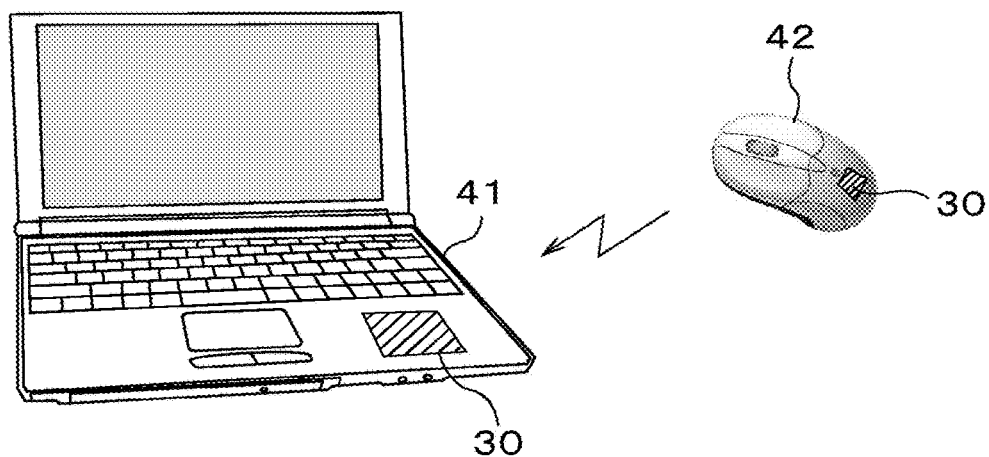
FIG. 26 is a view of exemplary performance of radio communication between a PC being a host device and a mouse being peripheral equipment.

FIG. 26 illustrates exemplary performance of radio communication between a PC 41 being a host device and a mouse 42 being peripheral equipment. Both the PC 41 and the mouse 42 include the radio communication device 30 illustrated in FIG. 25 built therein. The mouse 42 uses power of a built-in battery to perform the radio communication, and is required to perform the radio communication with power consumption as low as possible because a space in which the battery is built is limited. Accordingly, using a radio system capable of low consumption radio communication, such as Bluetooth Low Energy decided in a standard of Bluetooth (registered trademark) 4.0, preferably performs the radio communication.

Figure 27:
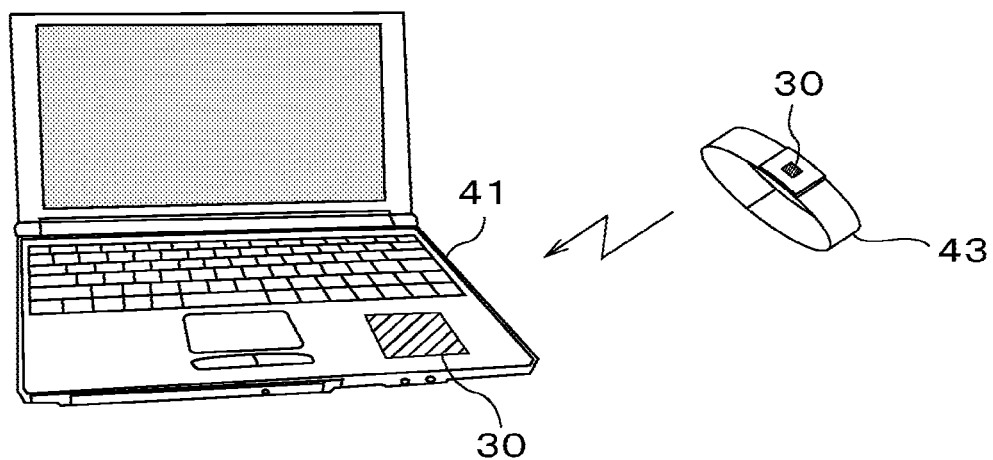
FIG. 27 is a view of exemplary performance of radio communication between a wearable terminal and a host device.

FIG. 27 illustrates exemplary performance of radio communication between a wearable terminal 43 and a host device (for example, the PC 41). The wearable terminal 43 is to be worn on a body of a person, and various examples thereof may include a seal type to be worn on a body, an eyeglasses type and an earphone type to be worn on a body except arms, and a pacemaker to be inserted inside a body, in addition to a type to be worn on an arm illustrated in FIG. 27. Both the wearable terminal 43 and the PC 41 in FIG. 27 also include the radio communication device 30 illustrated in FIG. 25 built therein. Note that, examples of the PC 41 include a computer and a server. The above radio system capable of the radio communication with low power consumption, such as Bluetooth Low Energy, is also preferably adopted because the wearable terminal 43 is worn on a body of a person and a space for a built-in battery is limited.

When the radio communication is performed between the radio communication devices 30 illustrated in FIG. 25, the type of information to be transmitted and received through the radio communication is not limited. Note that, the radio system is preferably varied between a case where information including a large amount of data, such as moving image data, is transmitted and received and a case where information including a small amount of data, such as operation information of the mouse 42, is transmitted and received. Thus, there is a need to perform the radio communication in an optimum radio system in response with the amount of information to be transmitted and received.

Furthermore, when the radio communication is performed between the radio communication devices 30 illustrated in FIG. 25, a notifying unit that notifies a user of an operation state of the radio communication, may be provided. Specific examples of the notifying unit may include display of the operation state on a display device including LEDs, notification of the operation state due to the vibration of a vibrator, and notification of the operation state from audio information due to a speaker or a buzzer.

The receivers 1 described in the respective embodiments described above, may at least partially include hardware or include software. When the configuration including the software is provided, a program for achieving the function of the at least partial receivers 1 may be stored in a storage medium, such as a flexible disk or a CD-ROM, and then may be read and performed by a computer. The storage medium is not limited to a detachably attachable storage medium, such as a magnetic disk or an optical disc, and may be a non-removable storage medium, such as a hard disk or a memory.

The program for achieving the function of the at least partial receivers 1, may be distributed through a communication line, such as the Internet, (including radio communication). Furthermore, the program that has been encrypted, modulated, or compressed, may be distributed through a wired line or a wireless line, such as the Internet, or may be stored in a storage medium and then may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A receiver comprising:
a receiving circuitry to receive a radio signal;
a signal detector to detect a reception signal in each of a plurality of set periods shifted in time to be overlapped in a partial period, from an output signal of the receiving circuitry; and
a demodulator to perform demodulation processing based on the reception signal detected by the signal detector,
the receiving circuitry comprises:
a first receiver to perform analog reception processing to the radio signal, with a first local oscillation signal; and
a second receiver to perform analog reception processing to the radio signal, with a second local oscillation signal having a phase different from the phase of the first local oscillation signal;
the first receiver comprises:
a local oscillator to generate the first local oscillation signal:
a first mixer to mix the radio signal and the local oscillation signal together to generate a first baseband signal; and
a first filter to remove an unnecessary frequency component included in the first baseband signal;
the second receiver comprises:
a phase shifter to generate the second local oscillation signal having a phase shifted from the shift of the first local oscillation signal by 90°;
a second mixer to mix the radio signal and the second local oscillation signal together to generate a second baseband signal; and
a second filter to remove an unnecessary frequency component included in the second baseband signal;
wherein the signal detector comprises:
a first signal detector to detect the reception signal from an output signal of the first receiver; and
a second signal detector to detect the reception signal from an output signal of the second receiver, and
the first signal detector and the second signal detector each comprise processing circuitry:
wherein the processing circuitry is configured to:
smooth the output signal of the receiving circuitry in each of the plurality of set periods;
output a signal obtained by comparing a level of the smoothed signal, with a threshold value; and
initialize the smoothed signal, every time the smoothed signal is compared with the threshold value, and
the demodulator performs the demodulation processing based on the smoothed signal determined to be the threshold value or more.

2. The receiver according to claim 1,
wherein the signal detector:
detects a noise signal, and
sets the threshold value based on the noise signal.

3. The receiver according to claim 1,
wherein the second receiver starts the analog reception processing after the first signal detector detects the reception signal.

4. The receiver according to claim 3,
wherein the demodulator performs, when the first signal detector detects the reception signal, the demodulation processing to the reception signal detected by the first signal detector, in parallel with the analog reception processing started by the second receiver and the detection processing of the reception signal started by the second signal detector, and then continues the demodulation processing when the second signal detector detects the reception signal.

5. The receiver according to claim 3,
wherein the second receiver halts the analog reception processing of the second receiver when the second signal detector detects no reception signal even though the second receiver starts the analog reception processing,
the demodulator cancels the demodulation processing when the second signal detector detects no reception signal even though the second receiver starts the analog reception processing, and
the first receiver resumes the analog reception processing when the second receiver halts the analog reception processing.

6. The receiver according to claim 1, further comprising:
a synchronizer to perform synchronization processing that synchronizes at least one of the output signal of the first receiver and the output signal of the second receiver, with a transmission signal of a transmitter.

7. The receiver according to claim 6,
wherein the synchronizer performs, when the first signal detector detects the reception signal, the synchronization processing to the output signal of the first receiver, in parallel with the analog reception processing performed by the second receiver, and then synchronizes the output signal of the second receiving unit receiver with the transmission signal when the second signal detector detects the reception signal, and
the demodulator demodulates at least one of the output signal of the first receiver and the output signal of the second receiver, synchronized by the synchronizing unit.

8. The receiver according to claim 6,
wherein the synchronizer performs, when the first signal detector detects the reception signal, the synchronization processing to the output signal of the first receiver, in parallel with the analog reception processing started by the second receiver and the detection processing of the reception signal started by the second signal detector, and then continues the synchronization processing when the second signal detector detects the reception signal, and halts the synchronization processing when the second signal detector detects no reception signal.

9. The receiver according to claim 1, further comprising:
a first A/D converter to convert an output signal of the first filter in the first receiver into a digital signal to output the digital signal; and
a second A/D converter to convert an output signal of the second filter in the second receiver into a digital signal to output the digital signal.

10. The receiver according to claim 1,
wherein the first receiver includes a first operation mode and a second operation mode having power consumption larger than the power consumption of the first operation mode and having reception processing accuracy higher than the reception processing accuracy of the first operation mode, and the first receiver operates in the first operation mode until the first signal detector detects the reception signal, and operates in the second operation mode when the reception signal is detected.

11. The receiver according to claim 1, further comprising:
a third receiver to perform analog reception processing to the radio signal; and
a third signal detector to detect the reception signal from an output signal of the third receiver,
wherein the third receiver and the second signal detector boot in awaiting the reception signal,
the first receiver and the second receiver boot in performing the synchronization processing after the reception signal is detected, and
the first receiver or the second receiver boots in performing the demodulation processing after the synchronization processing.

12. A radio communication device comprising:
an antenna to transmit and receive a radio signal;
a receiver to perform reception processing of the radio signal received by the antenna;
a transmitter to perform transmission processing of the radio signal transmitted by the antenna;
a controller to control the receiver and the transmitter,
wherein the receiver comprises:
a receiving circuitry to receive a radio signal;
a signal detector to detect a reception signal in each of a plurality of set periods shifted in time to be overlapped in a partial period, from an output signal of the receiving circuitry; and
a demodulator to perform demodulation processing based on the reception signal detected by the signal detector,
the receiving circuitry comprises:
a first receiver to perform analog reception processing to the radio signal, with a first local oscillation signal; and
a second receiver to perform analog reception processing to the radio signal, with a second local oscillation signal having a phase different from the phase of the first local oscillation signal;
the first receiver comprises:
a local oscillator to generate the first local oscillation signal;
a first mixer to mix the radio signal and the local oscillation signal together to generate a first baseband signal; and
a first filter to remove an unnecessary frequency component included in the first baseband signal;
the second receiver comprises:
a phase shifter to generate the second local oscillation signal having a phase shifted from the shift of the first local oscillation signal by 90°;
a second mixer to mix the radio signal and the second local oscillation signal together to generate a second baseband signal; and
a second filter to remove an unnecessary frequency component included in the second baseband signal;
wherein the signal detector comprises:
a first signal detector to detect the reception signal from an output signal of the first receiver; and
a second signal detector to detect the reception signal from an output signal of the second receiver, and
the first signal detector and the second signal detector each comprise processing circuitry:
wherein the processing circuitry is configured to:
smooth the output signal of the receiving circuitry in each of the plurality of set periods;
output a signal obtained by comparing a level of the smoothed signal, with a threshold value; and
initialize the smoothed signal, every time the smoothed signal is compared with the threshold value, and
the demodulator performs the demodulation processing based on the smoothed signal determined to be the threshold value or more.

13. The radio communication device to claim 12,
wherein the signal detector:
detects a noise signal, and
sets the threshold value based on the noise signal.

14. The radio communication device according to claim 12,
wherein the second receiver starts the analog reception processing after the first signal detector detects the reception signal.

15. The radio communication device according to claim 14,
wherein the demodulator performs, when the first signal detector detects the reception signal, the demodulation processing to the reception signal detected by the first signal detector, in parallel with the analog reception processing started by the second receiver and the detection processing of the reception signal started by the second signal detector, and then continues the demodulation processing when the second signal detector detects the reception signal.

16. The radio communication device according to claim 14,
wherein the second receiver halts the analog reception processing of the second receiver when the second signal detector detects no reception signal even though the second receiver starts the analog reception processing,
the demodulator cancels the demodulation processing when the second signal detector detects no reception signal even though the second receiver starts the analog reception processing, and
the first receiver resumes the analog reception processing when the second receiver halts the analog reception processing.

17. The radio communication device according to claim 12, further comprising:
a synchronizer to perform synchronization processing that synchronizes at least one of the output signal of the first receiver and the output signal of the second receiver, with a transmission signal of a transmitter.

18. The radio communication device according to claim 17,
wherein the synchronizer performs, when the first signal detector detects the reception signal, the synchronization processing to the output signal of the first receiver, in parallel with the analog reception processing performed by the second receiver, and then synchronizes the output signal of the second receiver with the transmission signal when the second signal detector detects the reception signal, and
the demodulator demodulates at least one of the output signal of the first receiver and the output signal of the second receiver, synchronized by the synchronizer.

* * * * *